(12) United States Patent
Bain

(10) Patent No.: US 9,880,970 B2
(45) Date of Patent: Jan. 30, 2018

(54) METHOD FOR IMPLEMENTING HIGHLY AVAILABLE DATA PARALLEL OPERATIONS ON A COMPUTATIONAL GRID

(76) Inventor: William L. Bain, Bellevue, WA (US)

( * ) Notice: Subject to any disclaimer, the term of this patent is extended or adjusted under 35 U.S.C. 154(b) by 0 days.

(21) Appl. No.: 12/733,926

(22) PCT Filed: Oct. 3, 2008

(86) PCT No.: PCT/US2008/011487
§ 371 (c)(1),
(2), (4) Date: Jun. 14, 2010

(87) PCT Pub. No.: WO2009/045526
PCT Pub. Date: Apr. 9, 2009

(65) Prior Publication Data
US 2010/0262871 A1    Oct. 14, 2010

Related U.S. Application Data

(60) Provisional application No. 60/997,612, filed on Oct. 3, 2007.

(51) Int. Cl.
*G06F 11/00* (2006.01)
*G06F 15/173* (2006.01)

(52) U.S. Cl.
CPC ................. *G06F 15/173* (2013.01)

(58) Field of Classification Search
None
See application file for complete search history.

(56) References Cited

U.S. PATENT DOCUMENTS

| | | | |
|---|---|---|---|
| 5,909,540 A * | 6/1999 | Carter et al. | 714/4.4 |
| 6,021,508 A * | 2/2000 | Schmuck et al. | 714/4.5 |
| 6,594,785 B1 * | 7/2003 | Gilbertson et al. | 714/48 |
| 7,024,582 B2 * | 4/2006 | Loy et al. | 714/4.4 |
| 7,024,587 B2 * | 4/2006 | Elko et al. | 714/12 |
| 7,103,586 B2 * | 9/2006 | Holenstein et al. | |
| 7,117,388 B2 * | 10/2006 | Arimilli et al. | 714/10 |
| 7,152,026 B1 * | 12/2006 | Merritt et al. | 703/21 |
| 7,302,609 B2 * | 11/2007 | Matena et al. | 714/15 |
| 7,516,360 B2 * | 4/2009 | Bacher et al. | 714/12 |
| 7,543,180 B2 * | 6/2009 | Gross et al. | 714/11 |

(Continued)

*Primary Examiner* — Christopher McCarthy
(74) *Attorney, Agent, or Firm* — James L. Davison

(57) ABSTRACT

The present invention describes a new method for implementing highly available data-parallel-operations on a computational grid. This new method provides high availability after a server fails or the grid experiences a partial network failure. The present invention invokes the data parallel operation's method on selected objects stored in partitions within a highly available distributed cache. It thereby takes advantage of the use of highly available data partitions implemented by the distributed cache as a means for reliably tracking the progress of method invocations within a data parallel operation even after a server or network failure occurs. Using the cache's partitions as the basis for tracking enables the present invention's method to restart method invocations and thereby ensure completion of the data-parallel operation. It also uses a completion object within the cache to ensure that completion of the data parallel operation is detected and reported in a highly available manner.

3 Claims, 5 Drawing Sheets

(56) References Cited

U.S. PATENT DOCUMENTS

| | | | |
|---|---|---|---|
| 7,617,411 B2* | 11/2009 | Baba et al. | 714/4.1 |
| 7,802,128 B2* | 9/2010 | Dasari et al. | 714/4.1 |
| 7,870,424 B2* | 1/2011 | Okabe | 714/11 |
| 2005/0188283 A1* | 8/2005 | Pomaranski et al. | 714/47 |
| 2005/0283658 A1* | 12/2005 | Clark et al. | 714/11 |
| 2008/0189573 A1* | 8/2008 | Darrington et al. | 714/11 |
| 2008/0270878 A1* | 10/2008 | He et al. | 714/805 |
| 2010/0318887 A1* | 12/2010 | Zvibel | 714/819 |

* cited by examiner

METHOD FOR IMPLEMENTING HIGHLY AVAILABLE DATA PARALLEL OPERATIONS ON A COMPUTATIONAL GRID

CROSS-REFERENCE TO RELATED APPLICATIONS

This application is entitled to the benefit of Provisional Application Ser. No. 60/997,612 filed Oct. 3, 2007.

BACKGROUND

Field

A computational grid (also known as a compute cluster) consists of a set of computers interconnected by a computer network which are used to run a single application program which is often called a parallel application. Each computer is usually called a computational node. The application program is subdivided into computational tasks, each of which is run on a different node, and each of which is a portion of a computer program. These tasks usually operate simultaneously on distinct data, and the tasks may communicate with each other as part of the overall computation performed by the application.

One example of a parallel application is a weather simulation model in which each node of the computational grid runs a task that models weather effects in a distinct region of the world at a given simulated time of day. All of the tasks together model the entire weather system for the combined regions at the simulated time. As part of each task, the node may communicate with other nodes to obtain or deliver weather information from a neighboring region. The parallel application models the weather over a sequence of time steps.

A common method for initiating the tasks that comprise the parallel application is to perform a data parallel operation in which one node instructs all nodes to perform a single computational function (sometimes called a method) on distinct sets of data (sometimes called objects). A data-parallel operation consists of a set of method invocations on selected data within most or all of the nodes of the computational grid. To maximize performance, these method invocations are run in parallel (that is, simultaneously) on the computational nodes All nodes execute this function and either produce new data or update their specific sets of data. As part of the implementation of the data parallel operation, the initiating node is informed when all nodes have finished running this method so that it can start another data parallel operation. An example of a data parallel operation is shown in FIG. 2.

For example, the objects which represent the above weather simulation model could be denoted as a list of region objects, region[r], for a set of regions r, and the computational method could be denoted by the function model_weather( ); this function operates on a region object. We can assume that the region objects have been partitioned among the nodes of the computational grid by some means (such as the use of a distributed cache). In a data parallel operation, one node instructs all nodes to run the model_weather( )method on their assigned regions.

Another example of a parallel application is a financial analysis application in which each node of the computational grid runs a task that analyzes a distinct set of financial portfolios and collects results for each portfolio. For example, the analysis might analyze each portfolio based on current market conditions to determine the portfolio's value. The results of each analysis are then combined into a final report covering all portfolios.

In the financial analysis example, the objects which represent the above financial portfolios could be denoted as a list of portfolio objects, portfolio[c], for a set of customers c, and the computational method could be denoted by the function analyze_portfolio( ); this function operates on a portfolio object. We can assume that the portfolio objects have been partitioned among the nodes of the computational grid by some means (such as the use of a distributed cache). In a data parallel operation, one node instructs all nodes to run the analyze_portfolio( )method on their locally stored portfolio objects. By doing so, the computational grid analyzes each node's subset of the portfolio objects in parallel to minimize the completion time of the operation.

Data parallel operations are distinguished from another method for initiating tasks, called control parallel operations (also called the manager/worker paradigm) in which the nodes within the grid repeatedly seek and receive independent work tasks from a manager node. Although both methods have uses in various applications, data parallel applications are the subject of the present invention.

The implementation of a data parallel operation requires that the following three steps be performed in sequence:
1. One node initiates a task on all nodes in order to invoke a specified method on multiple data sets.
2. All nodes perform the task by executing the specified method on distinct data sets.
3. All nodes communicate to the originating node (or its successor if a failure occurs) that the task has been completed on all specified data sets and report results which are merged together.

Data parallel operations have been implemented for numerous parallel computing systems for several decades. However, prior implementations usually have assumed that computational nodes and the communications between nodes do not fail during the execution of the data parallel operation. If a failure occurs, the data parallel operation is restarted. Unfortunately, many time-critical applications, such as financial services, cannot tolerate the delay required to re-run a data parallel operation.

An implementation of a data parallel operation that survives the failure of a server or its portion of the communications network is said to be a highly available implementation. The present invention describes a method to perform a highly available data parallel operation so that it can be successfully completed even if a node or a portion of the network (such as network interface card) fails during one of the three steps described above.

Description of Related Art

Numerous computational grids (also known as parallel computing systems) have been created over the last few decades to implement data parallel operations. Two examples include the Connection Machine from Thinking Machines, the Intel Paragon Parallel Supercomputer. More recently, computational grids have been implemented as clusters of server computers with data parallel operations implemented in software using standard TCP/IP communications networks. However, none of these implementations handles the problem of making data parallel operations highly available after a server or partial network failure.

Reliable, distributed computing systems have tackled the problem of creating a membership for a set of cooperating computers and making that membership highly available after a server fails. These systems provide a software layer that runs on all the cooperating computers and allows the computers to join and leave the common membership. They implement a form of reliable multicast, so all computers can be sure to have received a multicast message. If a computer should fail, the software forms a new membership and identifies the new membership to all surviving members. Member computers can send messages to one or more computers and can usually determine which nodes in each membership that have received their messages. Two examples of these distributed computing systems are Isis and Ensemble.

By using reliable multicast and detecting membership changes if a failure occurs, reliable, distributed computing systems have produced a method for implementing step 1 of a data parallel operation in a highly available manner. The black arrows in FIG. 2 illustrate the use of a reliable multicast to distribute a method invocation to all nodes. However, these systems have not implemented all three steps in a data parallel operation. In particular, they do not provide a means to ensure that the method is executed on all data sets and that the originating node (or its successor if a failure occurs) is notified of completion.

Because reliable, distributed computing systems are focused primarily on computer memberships, they do not provide a means to track the data assigned to each computer for the purposes of completing a data parallel operation. Knowing the new membership after a computer failure does not tell the surviving nodes which data sets the method has completed and which data sets still need the method executed on them. It also does not provide a means for managing the placement of data sets on the nodes so that the surviving nodes can re-distribute the tasks that would have been performed by the failed nodes.

Distributed caches, such as commercial software products from ScaleOut Software, Inc. and Tangosol, have been created to store data objects and make them available to all nodes in a computational grid (also known as a server farm). Distributed caches usually can be configured to keep all data objects highly available after a node or a portion of the network fails. This is accomplished by replicating the objects to other nodes and using the replicated copies, if necessary, to recover from a node failure. In addition, distributed caches usually can be configured to automatically distribute data objects among the nodes in the computation grid so that they are evenly spread across all servers. A popular method for doing this is to separate the data objects into groups of objects called partitions and to evenly distribute the partitions among the nodes. The number of partitions can be much larger than the number of nodes. (In general, the use of partitions to distribute load among the nodes of a computational grid has been well established in prior art.) An example of a partitioned, distributed data cache is shown in FIG. 3. If a node fails, the cache's partitions are re-distributed among the surviving nodes, as shown in FIG. 4, and the objects remain assigned to their original partitions; the number of partitions remains unchanged.

Combined with reliable multicast from distributed computing systems, a distributed cache forms an excellent basis for completing steps 1 and a portion of step 2 within a data parallel operation as described on page 2. First, the data sets to be operated on by the method can be stored in the distributed cache as data objects, which the cache has evenly distributed among the partitions of the cache and thereby among the nodes of the grid. Once a method invocation has been reliably multicast to all nodes in step 1, each node can invoke the method on the data objects that the distributed cache has placed on the local node (assuming that the distributed cache provides a means for doing this). Since the data objects are highly available, the data sets are not lost if a node fails or becomes inaccessible due to a partial network failure. Also, after a failure, the distributed cache redistributes all objects as necessary among the surviving nodes.

However, this combination of prior art does not fully implement steps 2 and 3 of a data parallel operation, and so it does not make the overall data parallel operation highly available. After a failure occurs, the prior art does not solve the problems of ensuring that the method has been successfully invoked on all specified data objects and that the completion of the data parallel operation is communicated to the originating node (or its successor after a failure).

SUMMARY

The present invention discloses a method for implementing highly available data-parallel operations in a computational grid comprised of multiple nodes (computers) by tracking the progress and completion of method invocations. The present invention makes use of a highly available, distributed cache system which stores at least two highly available partitions, containing at least one data object in each partition, among said multiple nodes, and distributing said partitions of a failed node among surviving nodes. The present invention uses the highly available partitions within the distributed cache instead of the nodes as the basis for implementing highly available data-parallel operations on the computational grid. The present invention's first step is to perform a data-parallel operation comprising a set of method invocations on selected objects within all partitions of the distributed cache and merges the results into another highly available object stored within the cache. The next step is to report the completion of the data-parallel operation on each partition to an initiating node, or a successor node if the initiating node fails, as to the completion of the method invocation on all selected data objects within each partition. The method on the initiating node or its successor node tracks the completion of the data-parallel operation by determining which partitions have reported their results for all constituent data objects to the initiating node or its successor. After the failure of a node, the method determines which partitions on the failed node have not reported results and restarts the method invocations for the data-parallel operation on said partitions on the surviving nodes so that the data-parallel operation is eventually completed.

DETAILED DESCRIPTION OF THE PREFERRED EMBODIMENT

Figure 1:
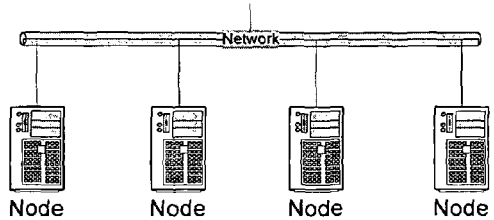
FIG. 1 is an example of a computational grid with four nodes.
Figure 2:
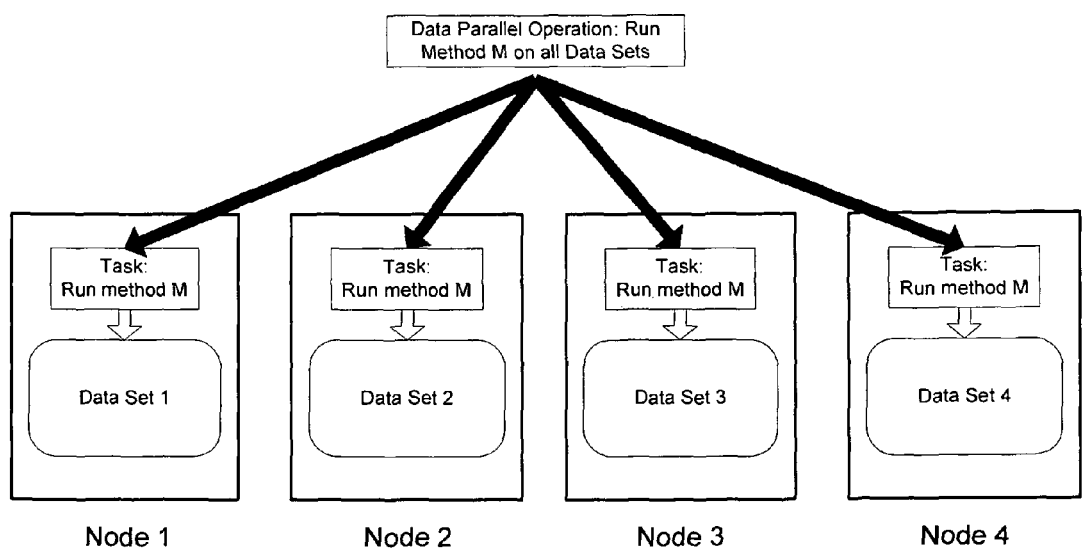
FIG. 2 illustrates a data parallel operation executed on computational grid with four nodes.
Figure 3:
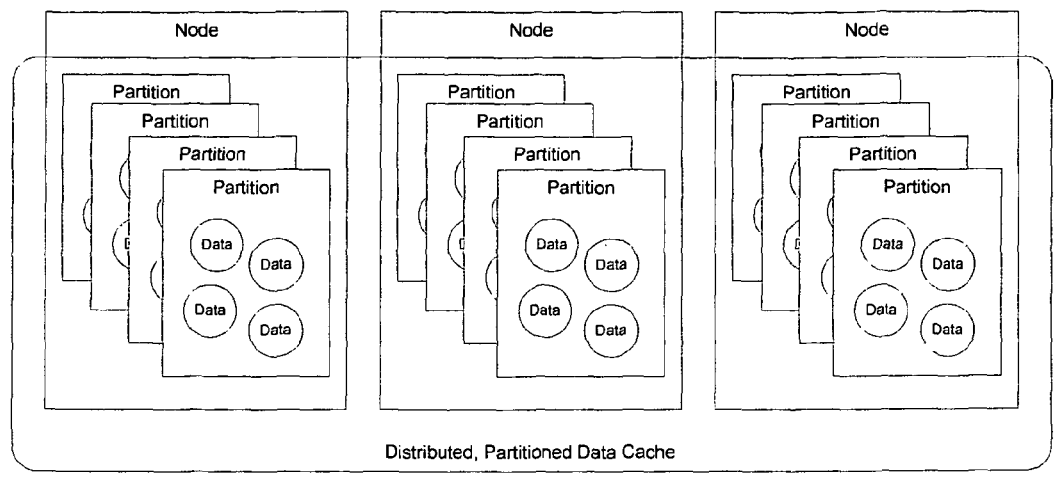
FIG. 3 shows a distributed and partitioned data cache that spans a computational grid (prior art).

FIG. 1 shows a typical prior art example of a computational grid with four nodes. FIG. 2 shows a prior art example of a data parallel operation executed on computational grid with four nodes. This operation runs method M in parallel on four data sets. Note that the operation can be initiated by any of the nodes FIG. 3 shows a distributed and partitioned data cache that spans a computational grid (prior art). The data cache makes data objects (the circles in the diagram) globally accessible to all nodes, and it keeps them highly available after a server or a portion of the network fails. The cache is organized as a set of partitions, each of which holds a subset of the data objects in the cache. The partitions are then evenly distributed across the nodes and redistributed as necessary after a node or partial network failure. The ability to do this is well known by those skilled in the art. Note that there can be more partitions than nodes, as shown in the diagram.

Figure 4:
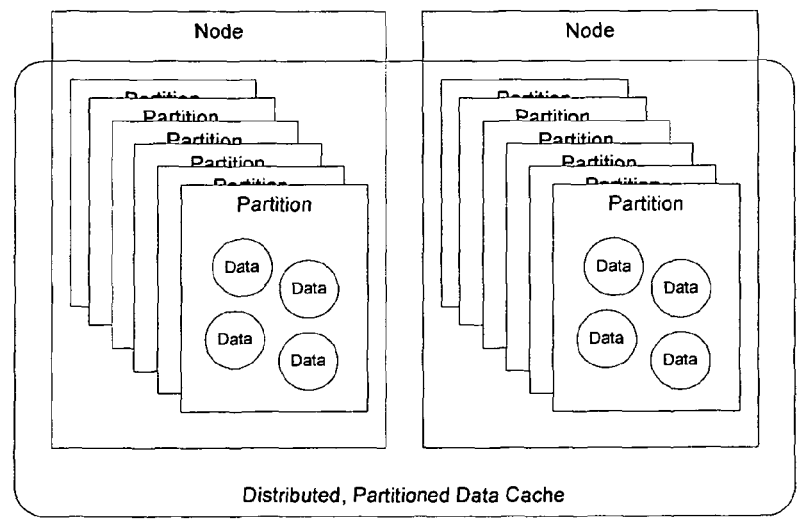
FIG. 4 shows a distributed and partitioned data cache after the failure of a node.

FIG. 4 shows a distributed and partitioned data cache after the failure of a node. Note that the partitions have been redistributed among the surviving nodes. The total number of partitions before the failure of the node remains unchanged, and, all data objects remain assigned to their original partitions.

Figure 5:
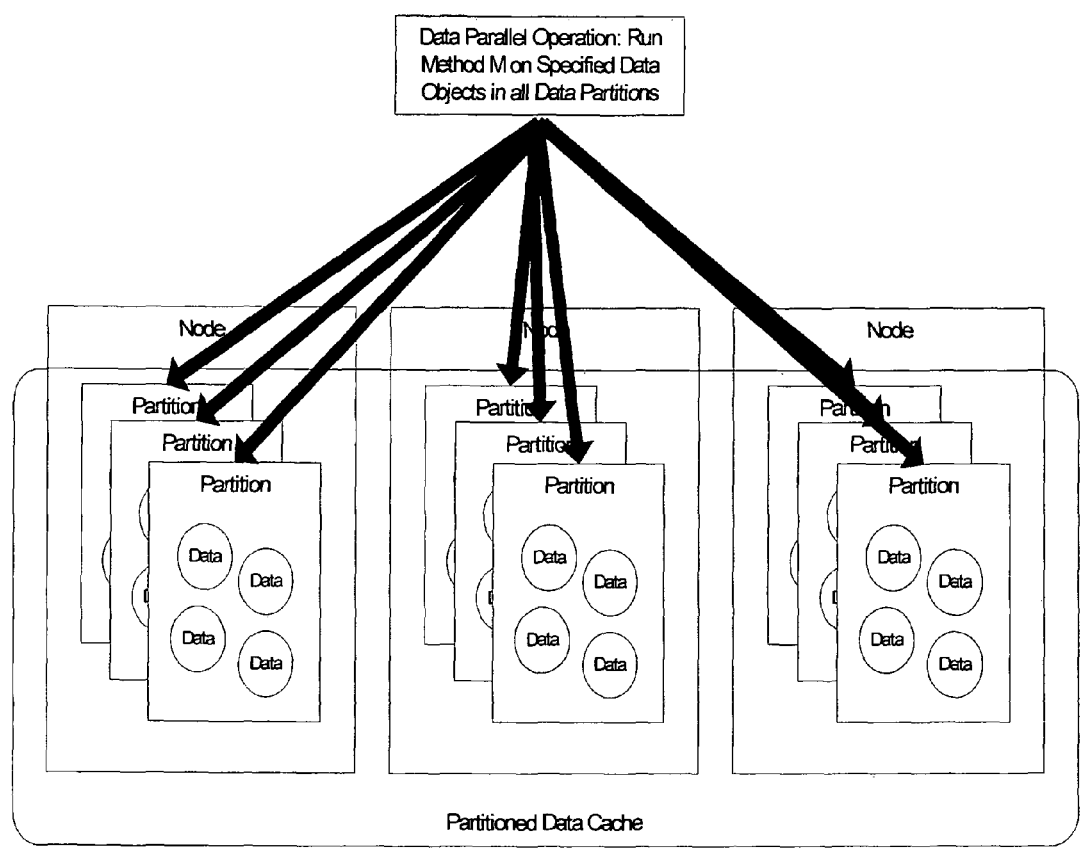
FIG. 5 shows an invocation of a data parallel operation on all partitions in a partitioned, distributed data cache.

FIG. 5 shows an invocation of a data parallel operation on all partitions in a partitioned, distributed data cache in step 1 of the present invention. Note that the operation's method is invoked on a specified set of data objects which may be a subset of all objects contained in the data partitions.

The essence of the present invention is a new mechanism that makes a data parallel operation highly available by invoking the operation's method on the partitions of a distributed cache instead of on the nodes within the computation grid. Since the partitions and the data objects which they contain are distributed evenly across the nodes, the data parallel operation is invoked on all nodes in the computational grid, as was shown in FIG. 5. The use of data partitions to track its progress makes it possible to track the progress and completion of the data parallel operation by maintaining this state information within highly available objects in the distributed cache and to restart data-parallel operations after a node fails. The use of partitions provides a basis to determine which operations must be restarted after a node failure. Also, note that the distributed cache can restart this algorithm on another node (called a successor node) in case a failure occurs while the algorithm is running by several means established in prior art.

Figure 6:
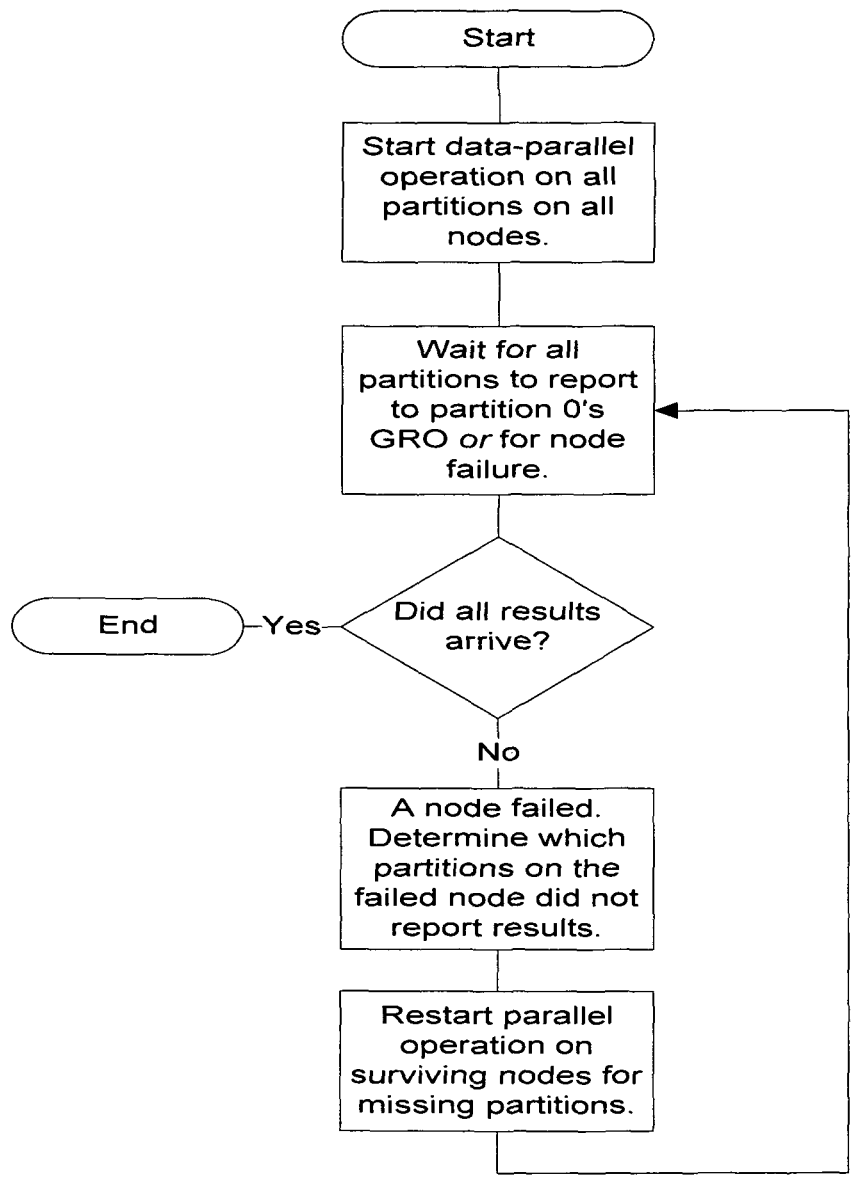
FIG. 6 shows a sequence of steps for the implementation of a highly available, data parallel operation in the present invention.

FIG. 6 shows the sequence of steps for the implementation of a highly available, data parallel operation in the present invention. In the first step, the data-parallel operation is started on all nodes for all selected objects within all partitions, and step 2 awaits completion of the data-parallel operation or a report of a node failure. Note that the data cache maintains all partitions and their constituent data objects in a highly available manner so that they survive a node or partial network failure.

Also, the merge operation in step 3 is also performed as a highly available update to the global results object which merges the results from all partitions. Each partition creates a local results object (RO) which it merges into the global results object (GRO) in step 3. Note that this merge could be performed in a series of steps, such as in a binary merge tree, and each RO need not directly merge with the GRO. A list of partitions for the results objects which have been merged into the global results object is maintained by the global results object. When all of the data cache's partitions have reported results, the data-parallel operation has been completed.

FIG. 6 in particular represents the algorithm for recovery from a failed node during a data-parallel operation. This algorithm is run on a computer node which is responsible for starting and completing the data-parallel operation. The algorithm determines that a node has failed while waiting for the completion of the data-parallel operation. (The distributed cache provides a mechanism to report a node failure and to report which partitions are stored on which node. Node failure also can be determined by other means, such as by awaiting a timeout on the completion of the data-parallel operation instead of by receiving an explicit report of node failure.) In this case, the algorithm restarts the data-parallel operation for those partitions on the failed node which failed to report their results to partition 0's global results object (GRO) using the partition list stored with the GRO. Note that the distributed data cache automatically re-hosts a failed node's partitions on other nodes to recover from a failure. This enables the surviving nodes to calculate the missing results when the data-parallel operation is restarted and to eventually complete the operation. Also, note that the distributed cache can restart this algorithm on another node in case a failure occurs while the algorithm is running.

Figure 7:
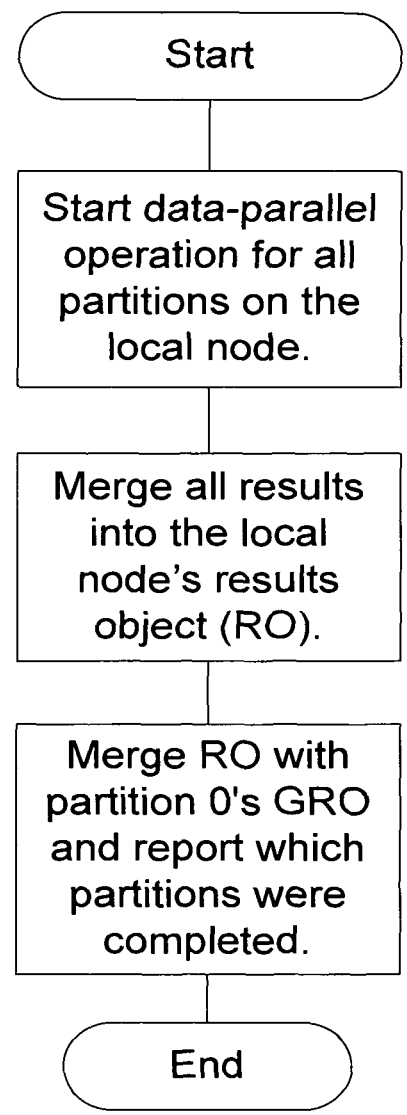
FIG. 7 illustrates how a data-parallel operation is performed on each node.

FIG. 7 shows the data-parallel operation which is performed on each node. This operation invokes the data-parallel operation on all selected objects within the partitions residing on the local node. It then merges the results into a local results object, RO. Finally, it merges RO into partition 0's global results object, GRO and reports which partitions of the distributed cache have been completed. Note that the implementation can merge RO into other intermediate results objects instead of directly into the GRO, for example, in a binary merge tree. If a node failure occurs, the sequence of steps shown in FIG. 7 could be interrupted, and no results would be reported. In this case, the sequence of steps shown in FIG. 6 would restart the data-parallel operation on the partitions that did not report results due to the node failure.

This sequence is:
1. One node distributes a method invocation to a specified set of objects in the distributed cache. These objects contain the data sets upon which the method will be invoked. (Note that the set of objects can be selected using the distributed cache's query mechanism as is well established by those skilled in the prior art.) The data cache in turn distributes the method invocation to all partitions for invocation on a specified set of objects within each partition.
2. The distributed cache on all nodes invokes the method on all specified objects within the partitions on each node. Each partition tracks the objects which have completed the method invocation and store this information within a local results object, which is a portion of the partition's highly available, replicated storage. If a server fails or becomes unavailable after a partial network failure, the distributed cache re-hosts its partitions on the surviving nodes, and these nodes complete the method invocations for all locally hosted partitions. This is accomplished by examining the local results object as part of the normal recovery of the data cache's partitions and then invoking the method on the remaining objects within the partition. (Note that multiple failures may cause this recovery process to be repeated.)
3. Using the results object, each partition within the distributed cache determines when the partition has completed all method invocations for that partition. It then merges this information into a global results object, which stores the completion progress for all partitions. The merge operation takes the form of an update to the global results object or an update to intermediate results objects which then merge into the global results object. When the last merge determines that all partitions have reported completion, the distributed cache signals the originating node (or its successor if a failure occurs). If a node fails prior to or during a merge into the global results object, the method invocations and merge operations for partitions on the failed node are restarted as necessary on the surviving nodes after normal recovery of the data partitions, as in step 2. Also, the global results object is guaranteed to survive a server failure as a stored object within the distributed cache.

It should be noted that the merge operations also can perform a user-specified reduction operation to combine the results of the data parallel method invocations. For example, a maximum value across all data objects could be computed. In this manner, the method of the present invention serves to implement a highly available map/reduce algorithm. Map/reduce algorithms have been described in prior art and are widely used.

This method for implementing data parallel operations in a highly available manner has three key advantages over prior art:

In step 1, the invention enjoys the same scalability as does the direct invocation of the method on the nodes because the data cache's partitions are distributed evenly across all nodes and the data objects are evenly distributed across all partitions. This ensures that all nodes participate in the data parallel operation and do the same amount of work, and this remains true even after a failure occurs.

The use of data partitions to track data parallel operations forms a natural basis for handling server and partial network failures. Since the number of partitions and their constituent objects remains invariant before and after a server or partial network failure, the progress of the data parallel operation in step 2 can be reliably tracked by the partitions, and the operation's completion in step 3 can be reliably reported. The use of the distributed cache's data partitions and the results objects to track the progress of the data parallel operation takes advantage of their inherent high availability through data replication and recovery of the distributed cache. The present invention provides the high availability missing in today's data parallel systems.

This method of implementing and tracking a data parallel operation also avoids the difficulty and complexity of having the application program track a sequence of node memberships to determine which data objects have invoked the method or remain to be handled by the data parallel operation in step 2. In a distributed computing system that employs reliable multicast across known memberships, the nodes within a membership do not have a deductive ability for knowing which data objects they should individually operate on after a server failure. Implementing a repartitioning of the objects across the nodes after a failure is equivalent to implementing a highly available distributed cache with partitions. The present invention constitutes a significantly less complex and more reliable method of tracking the completion of data parallel operations.

Therefore, although the invention has been described as setting forth specific embodiments thereof, the invention is not limited thereto. Changes in the details may be made within the spirit and the scope of the invention, said spirit and scope to be construed broadly and not to be limited except by the character of the claims appended hereto.

I claim:

1. A method for implementing highly available data-parallel operations in a computational grid comprised of multiple nodes by tracking the progress and completion of method invocations, comprising:
   a) a highly available, distributed cache system with multiple nodes, each node having a set of data objects packaged into multiple partitions;
   b) an initiating node starting a data-parallel operation, said operation comprising a set of method invocations made on selected data objects within all or some of said multiple partitions;
   c) each affected partition, containing data object(s) effected by the method invocation, reporting completion of the data-parallel operation to the initiating node, or a successor node if the initiating node fails;
   d) tracking completion of the data-parallel operation by determining which partition(s) have failed to report results to the initiating node or its successor; and
   e) resending the method invocations to alternate partition(s), residing in the computational grid as a result of being in a highly available condition, that replaced the non-reporting partition(s).

2. The method of claim 1 wherein the failure to report the results of the method invocation is due to network communication link failure.

3. The method of claim 1 wherein the failure to report the results of the method invocation is due to a node failure itself.

* * * * *